(12) United States Patent
Stark

(10) Patent No.: US 6,182,747 B1
(45) Date of Patent: Feb. 6, 2001

(54) PLATE-TYPE CROSSFLOW AIR-TO-AIR HEAT-EXCHANGER COMPRISING SIDE-BY-SIDE-MULTIPLE SMALL-PLATES

(75) Inventor: Walter Stark, Halesite, NY (US)

(73) Assignee: Nautica Dehumidifiers, Inc., Huntington Station, NY (US)

( * ) Notice: Under 35 U.S.C. 154(b), the term of this patent shall be extended for 0 days.

(21) Appl. No.: 09/211,187

(22) Filed: Dec. 14, 1998

Related U.S. Application Data

(63) Continuation-in-part of application No. 09/165,322, filed on Oct. 2, 1998, now Pat. No. 5,913,360, which is a continuation-in-part of application No. 08/527,653, filed on Sep. 13, 1995, now Pat. No. 5,816,315.

(51) Int. Cl.[7] .................................. F28D 9/00; F24F 7/08
(52) U.S. Cl. ............................. 165/166; 165/54; 165/909
(58) Field of Search .............................. 165/54, 166, 909

(56) References Cited

U.S. PATENT DOCUMENTS

| | | | | |
|---|---|---|---|---|
| 1,825,498 | * | 9/1931 | Wagan .................................. | 165/54 |
| 2,093,725 | | 9/1937 | Hull . | |
| 2,093,968 | * | 9/1937 | Ketlering . | |
| 2,128,661 | | 8/1938 | Folsom . | |

(List continued on next page.)

FOREIGN PATENT DOCUMENTS

| | | | | |
|---|---|---|---|---|
| 470100 | | 12/1950 | (CA) . | |
| 818603 | | 8/1959 | (CA) . | |
| 2514713 | | 10/1975 | (DE) . | |
| 2616556 | * | 5/1977 | (DE) . | |
| 0086175 | | 2/1983 | (EP) . | |
| 47-019990 | | 2/1971 | (JP) . | |
| 54-44255 | | 4/1979 | (JP) . | |
| 0049666 | * | 4/1979 | (JP) ...................................... 165/54 |
| 55-121394 | | 9/1980 | (JP) . | |
| 55-160297 | | 12/1980 | (JP) . | |
| 0224245 | * | 12/1983 | (JP) ...................................... 165/54 |
| 0063491 | * | 4/1984 | (JP) .................................... 165/166 |
| 0046146 | * | 2/1987 | (JP) ...................................... 165/54 |
| 0003139 | * | 1/1988 | (JP) ...................................... 165/54 |
| 0123940 | * | 5/1988 | (JP) ...................................... 165/54 |
| 0311086 | * | 12/1988 | (JP) ........................................ 62/93 |
| 0184358 | * | 7/1989 | (JP) ...................................... 165/54 |
| 0281138 | * | 10/1992 | (JP) ...................................... 165/54 |
| 851082 | | 7/1981 | (SU) . | |

*Primary Examiner*—John K. Ford
(74) *Attorney, Agent, or Firm*—Abelman, Frayne & Schwab

(57) ABSTRACT

An air-to-air heat exchanging system for a first air stream and a second air stream includes at least two air-to-air heat exchangers, each having heat conducting walls, secured to a frame. Two manifold assemblies, each including triangular dividers and triangular ends are positioned such that the triangular dividers and triangular ends are substantially perpendicular to the heat conducting walls of the air-to-air heat exchangers. Inlets and outlets for the first air stream and the second air stream are provided in the manifold assemblies.

5 Claims, 7 Drawing Sheets

U.S. PATENT DOCUMENTS

| | | | |
|---|---|---|---|
| 2,691,488 | * 10/1954 | Ghai | 165/66 |
| 2,828,947 | 4/1958 | Hedbom . | |
| 2,875,986 | * 3/1959 | Holm | 165/66 |
| 3,224,842 | * 12/1965 | Manske | 165/135 |
| 3,265,129 | 8/1966 | Bawabe . | |
| 3,513,907 | 5/1970 | Hughes . | |
| 3,666,007 | 5/1972 | Yoshino et al. . | |
| 3,797,565 | * 3/1974 | Fernandes | 62/93 |
| 3,860,065 | 1/1975 | Schauls . | |
| 3,866,674 | 2/1975 | Tramuta et al. . | |
| 4,041,591 | 8/1977 | Noll et al. . | |
| 4,051,898 | 10/1977 | Yoshino et al. . | |
| 4,099,928 | 7/1978 | Norback . | |
| 4,334,577 | 6/1982 | George . | |
| 4,377,201 | 3/1983 | Kruse et al. . | |
| 4,377,400 | 3/1983 | Okamoto et al. . | |
| 4,429,735 | 2/1984 | Womaguchi et al. . | |
| 4,512,397 | 4/1985 | Stark . | |
| 4,517,810 | 5/1985 | Foley et al. . | |
| 4,579,163 | * 4/1986 | Maendel | 165/54 |
| 4,761,966 | 8/1988 | Stark . | |
| 4,862,953 | 9/1989 | Granetzke et al. . | |
| 4,971,137 | 11/1990 | Thompson . | |
| 4,998,580 | 3/1991 | Guntly et al. . | |
| 5,036,907 | 8/1991 | Leven . | |
| 5,279,360 | 1/1994 | Hughes et al. . | |
| 5,816,315 | * 10/1998 | Stark | 165/54 |

\* cited by examiner

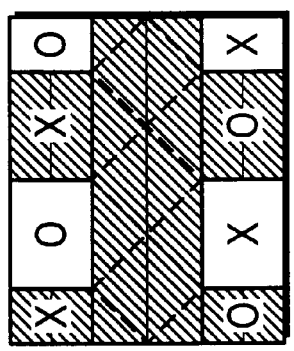
FIG. 6C
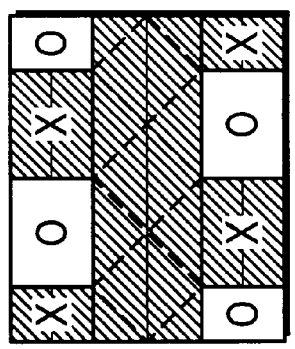
FIG. 6F
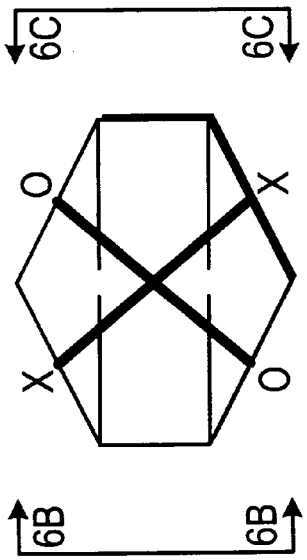
FIG. 6A
FIG. 6D
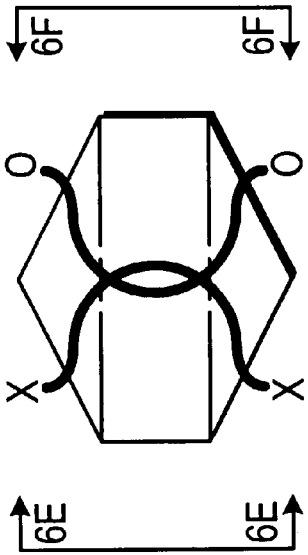
○ AIRFLOW 1
× AIRFLOW 2
▨ BLOCKED AREA
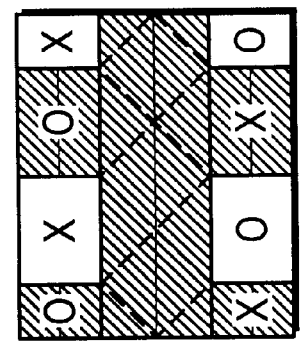
FIG. 6B
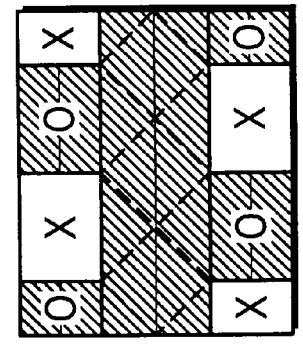
FIG. 6E

○ AIRFLOW 1
X AIRFLOW 2

▨ BLOCKED AREA

PLATE-TYPE CROSSFLOW AIR-TO-AIR HEAT-EXCHANGER COMPRISING SIDE-BY-SIDE-MULTIPLE SMALL-PLATES

CROSS REFERENCE TO RELATED APPLICATIONS

This application is a continuation in part of application Ser. No. 09/165,322, filed Oct. 2, 1998 and now U.S. Pat. No. 5,913,360 which is a continuation in part of application Ser. No. 08/527,653, filed Sep. 13, 1995 and now U.S. Pat. No. 5,816,315, the disclosures of which are incorporated herein by reference.

BACKGROUND OF THE INVENTION

1. Field of the Invention

The present invention relates to an improvement in the exchange of heat between two airstreams through the provision of plate-type crossflow air-to-air heat exchangers having a series of parallel channels alternately blocked and enclosed in a housing which forces one airstream to be directed through the exhaust air channels and a second airstream to be directed through the supply air channels, in substantially crossflow arrangement, for the exchange of heat.

The invention further includes the provision of arranging a number of the heat exchanger units side-by-side with a manifold to disperse and gather the related airstreams to a plenum chamber to reduce the size of the system and the energy requirements for operating the system to condition a large volume of air.

2. Discussion of the Prior Art

Fresh-air for residences and buildings is needed to maintain proper indoor air quality. This fresh-air must be heated or cooled, depending on weather conditions and this typically requires relatively large amounts of energy. Devices that exchange heat between airstreams are well known, whereby the stale air being exhausted from a building serves as the energy source for heating or cooling incoming outside air.

In the prior art, there exists a number of crossflow plate type air-to-air heat exchangers. These heat exchange devices may be constructed of plastic or metal for sensible heat exchange or they can be constructed of homogenous material such as paper for sensible and latent energy exchange.

In the prior art heat exchangers there is generally required a large space to house the large plate cross flow heat exchanger. As the plates of a plate heat exchanger increase in size, for a given efficiency, the spacing between the plate's increase in distance. This increase in plate spacing accounts for significant increase in the size of the apparatus.

Volumetric efficiency quantifies the required equipment volume in per unit of capacity at a given performance level. In plate-type crossbow air-to-air heat exchangers, to increase the volumetric efficiency and economy of the unit the smallest possible plate size should be used. However, crossflow heat exchangers with smaller plates generally require more length, i.e. more plates, to handle air volumes equal to that of units with larger plates. Increasing the plate size will require a larger installation space, which may limit the performance of the heat exchanger. In addition, when using crossflow plate-type air-to-air heat exchangers with smaller plates, the length, or number of plates, typically exceeds the allowable dimension or number of plates.

The novel heat exchanger of the present invention obviates the disadvantages associated with the prior art, by providing a plate-type crossbow air-to-air heat exchanger having a plurality of plates while maintaining a seal between the intake channels and exhaust channels as will be described below. The heat exchanger of the present invention also facilitates installation in a system which utilizes a number of small units to reduce the size required for installation, and ultimately provide an efficiently operating and economical system for recovering heat in buildings such as homes and offices.

SUMMARY OF THE INVENTION

In heat exchange systems, two airstreams are allowed to pass in channels in close proximity to each other, where the channels are separated by a heat conducting channel wall which, on one side, comprises the heat conducting channel wall for the intake airstream and on the other side comprises the heat conducting channel wall for the exhaust airstream. By so arranging the flow of air, temperature difference between the intake air and the exhaust air provides for thermal transfer through the wall with heat naturally flowing from the higher temperature air to the lower temperature air.

In the present invention, the apparatus is utilized as a heat exchanger, where the intake air is heated or cooled in a plate heat exchanger using the heat energy in the exhaust air. The exhaust airflow travels through the exhaust channels, of which at least one wall of the channel represents the wall separating the intake channel from the exhaust channel. Through this wall occurs the heat exchange process.

The apparatus of the present invention includes a plurality of heat conducting walls arranged face to face until they reach the limit and then arranges side-by-side in rows to complete the necessary amount of heat exchange space. The number of intake and exhaust channels is determined by the amount of plates provided, which is variable with respect to the installation in which the heat exchanger will be utilized. The square shape of the heat exchanger is preferably positioned on a point of the square, such that a diagonal running from one corner of the square to its opposite corner is generally vertical when the unit is installed.

The heat exchanger plates, or heat conducting walls, may be provided with means for enhancing the heat conduction process, such as heat conducting spacers, or preferably, a series of corrugations which extend between the walls and are in thermal contact with each of the walls. The corrugations serve the dual purpose of enhancing heat transfer between the walls to facilitate the heat exchange process, and also provide flow paths for the airstream to seal the intake channels from the exhaust channels. The preferred arrangement is crossflow, where the air path in the intake channels are substantially arranged at right angles to the air path in the exhaust channels, to define the flow path through the heat conducting walls so that the intake airflow is substantially in a crossflow arrangement from the exhaust airflow.

The present invention includes two manifolds, comprising entrance and exit ports for the intake air stream and entrance and exit ports for the exhaust air stream. The flow pattern through the apparatus is a function of how the manifolds are baffled in relation to one another. Flow pattern may be arranged for either cross flow or parallel flow.

BRIEF DESCRIPTION OF THE DRAWINGS

FIGS. 6A, 6D, 6G, and 6J are side views of the air path alternatives available through the apparatus by employing different manifold blocking patterns.

FIG. 6B is a view of FIG. 6A taken along section line 6B—6B.

FIG. 6C is a view of FIG. 6A taken along section line 6C—6C.

FIG. 6E is a view of FIG. 6D taken along section line 6E—6E.

FIG. 6F is a view of FIG. 6D taken along section line 6F—6F.

DETAILED DESCRIPTION OF THE INVENTION

Figure 1:
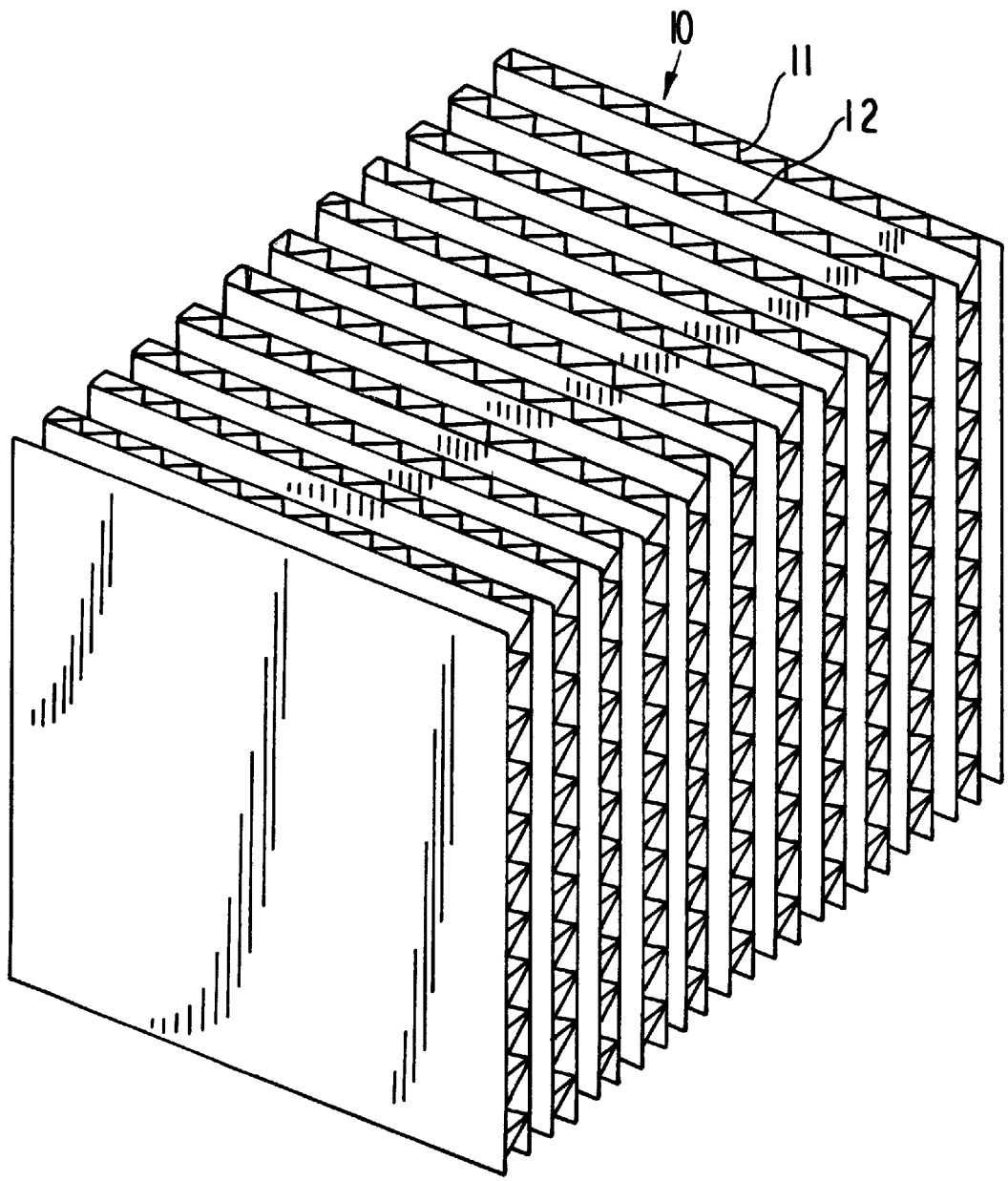
FIG. 1 illustrates a perspective view of a basic cross-flow type air-to-air heat exchange element 10 with heat conducting walls 12 and corrugations 11 provided between the walls of the plate-type heat exchanger.

FIG. 1 illustrates a basic cross-flow type air-to-air heat exchange element 10 with corrugated separations 11 that aid in conveying heat to the heat conducting walls 12 and also as a means for separating the heat conducting walls 12.

Figure 2:
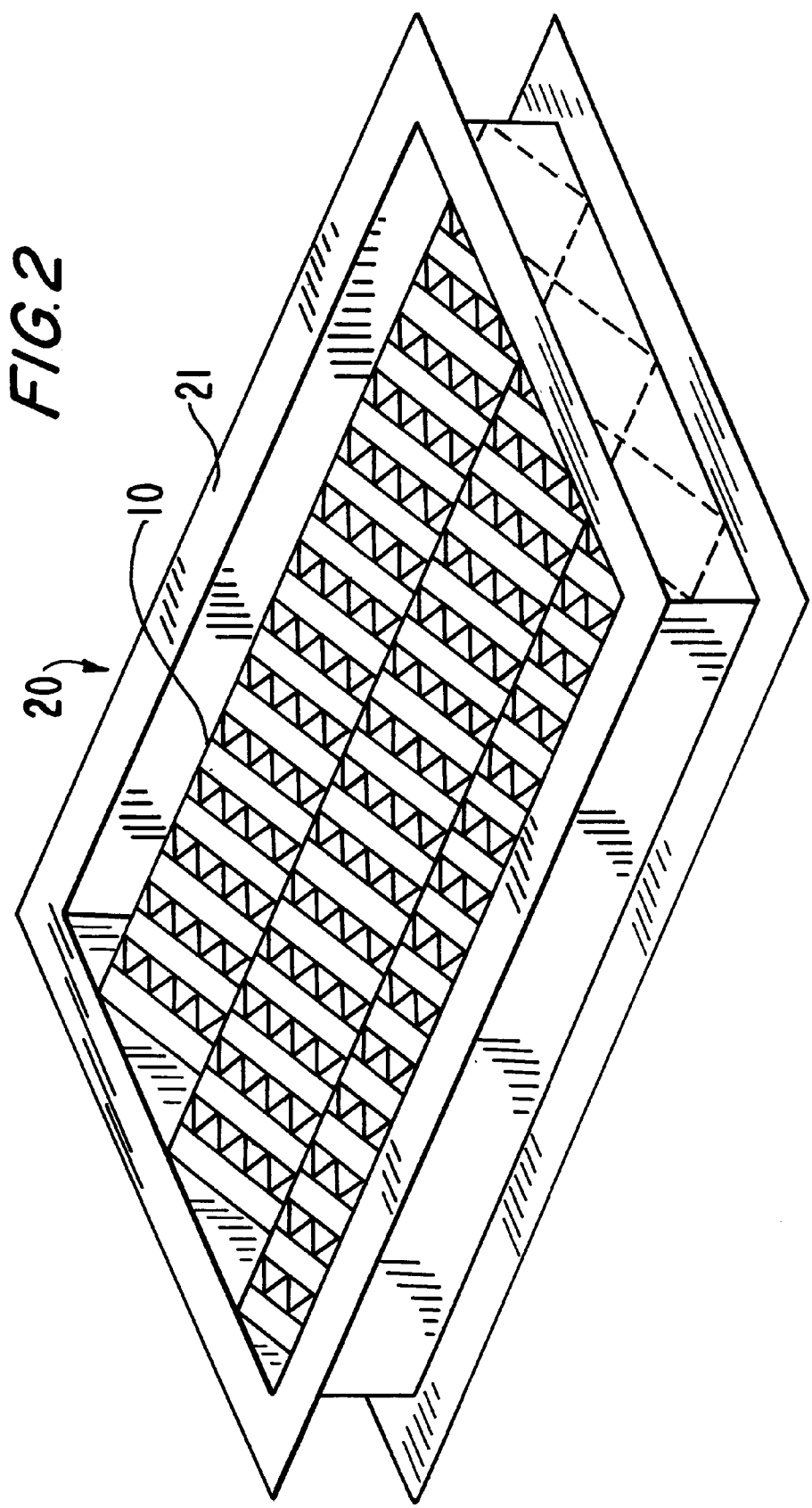
FIG. 2 illustrates the heat exchanger frame assembly 20 with multiple heat exchange elements 10 installed in a frame 21.

FIG. 2 illustrates the heat exchanger frame assembly 20 with multiple heat exchange elements 10 placed in rows and installed in frame 21.

Figure 3:
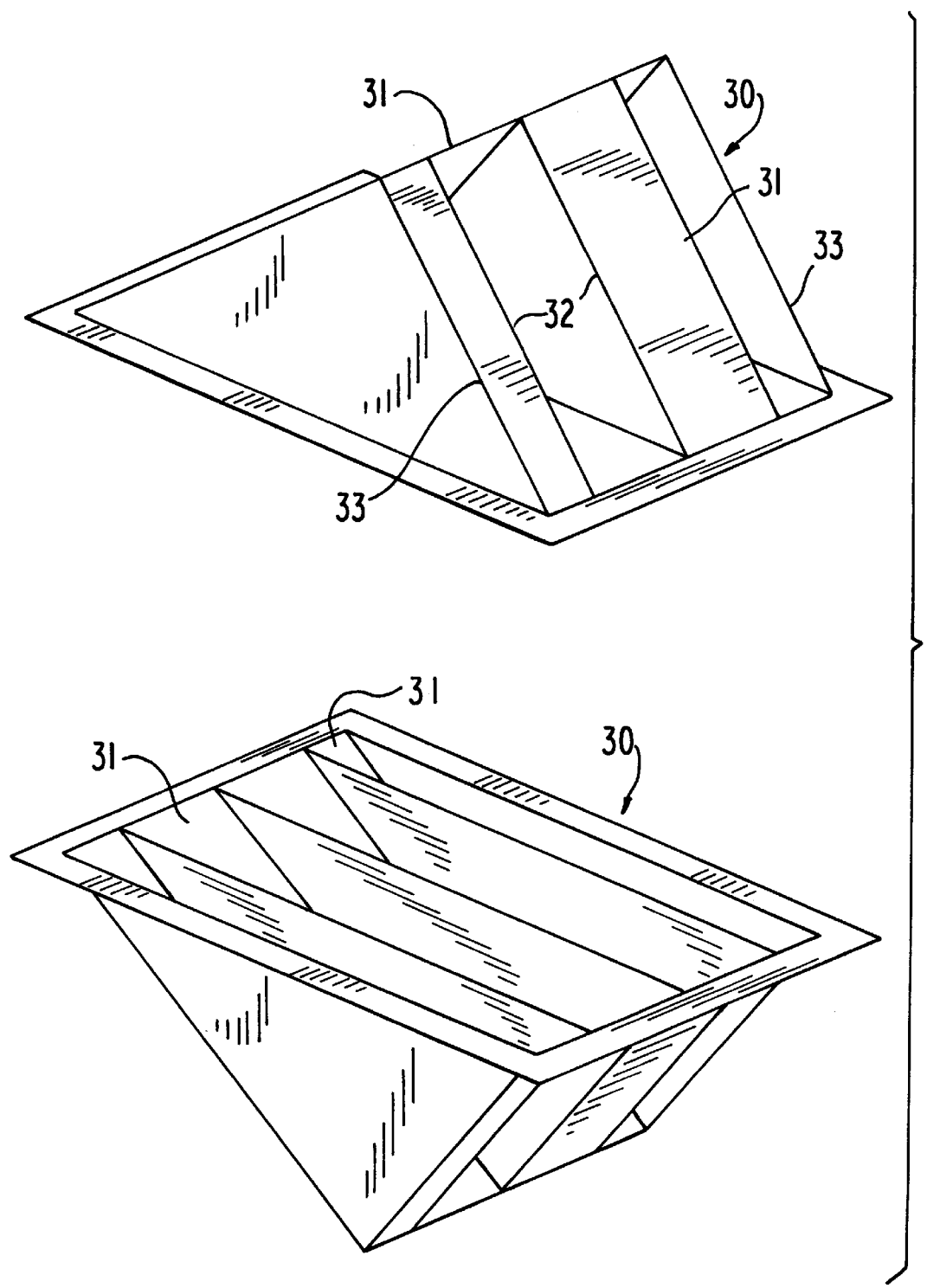
FIG. 3 illustrates the manifold assemblies 30 with openings alternately blocked 31 to force the air to take a particular path through the heat exchange elements 10.

FIG. 3 illustrates the manifold assemblies 30 with openings alternately blocked 31 to force the air to take a particular path through the heat exchange elements 10. Manifold assemblies 30 include dividers 32 and ends 33 which define isosceles triangles, but may be of other triangular shapes similar to the shapes disclosed in U.S. Pat. No. 5,913,360.

Figure 4:
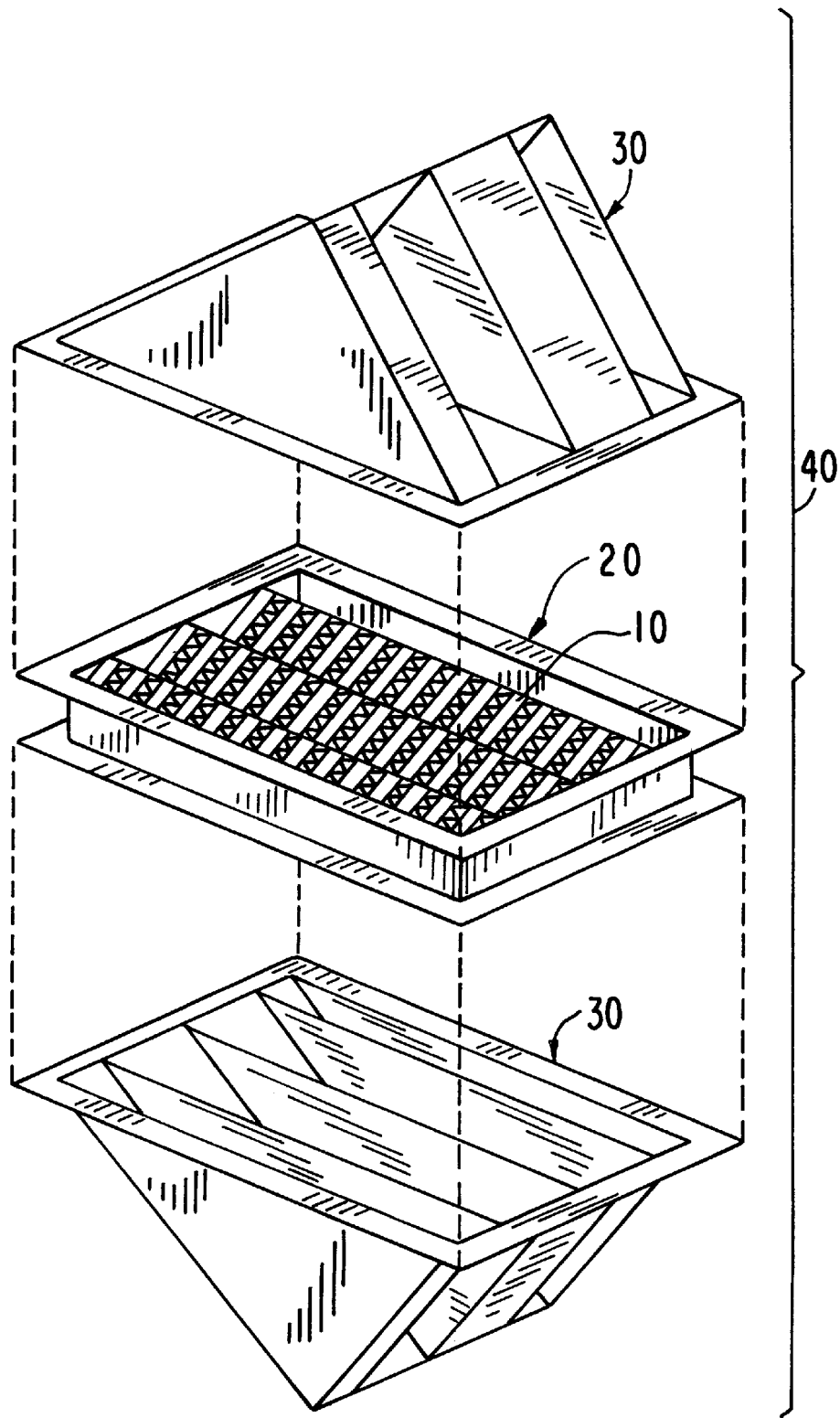
FIG. 4 illustrates an exploded view of the entire assembly 40 showing heat exchanger assembly 20 with heat exchange elements 10 and manifolds 30.

FIG. 4 illustrates an exploded view of the entire assembly 40 showing heat exchanger assembly 20 with heat exchange elements 10 and manifolds 30.

Figure 5:
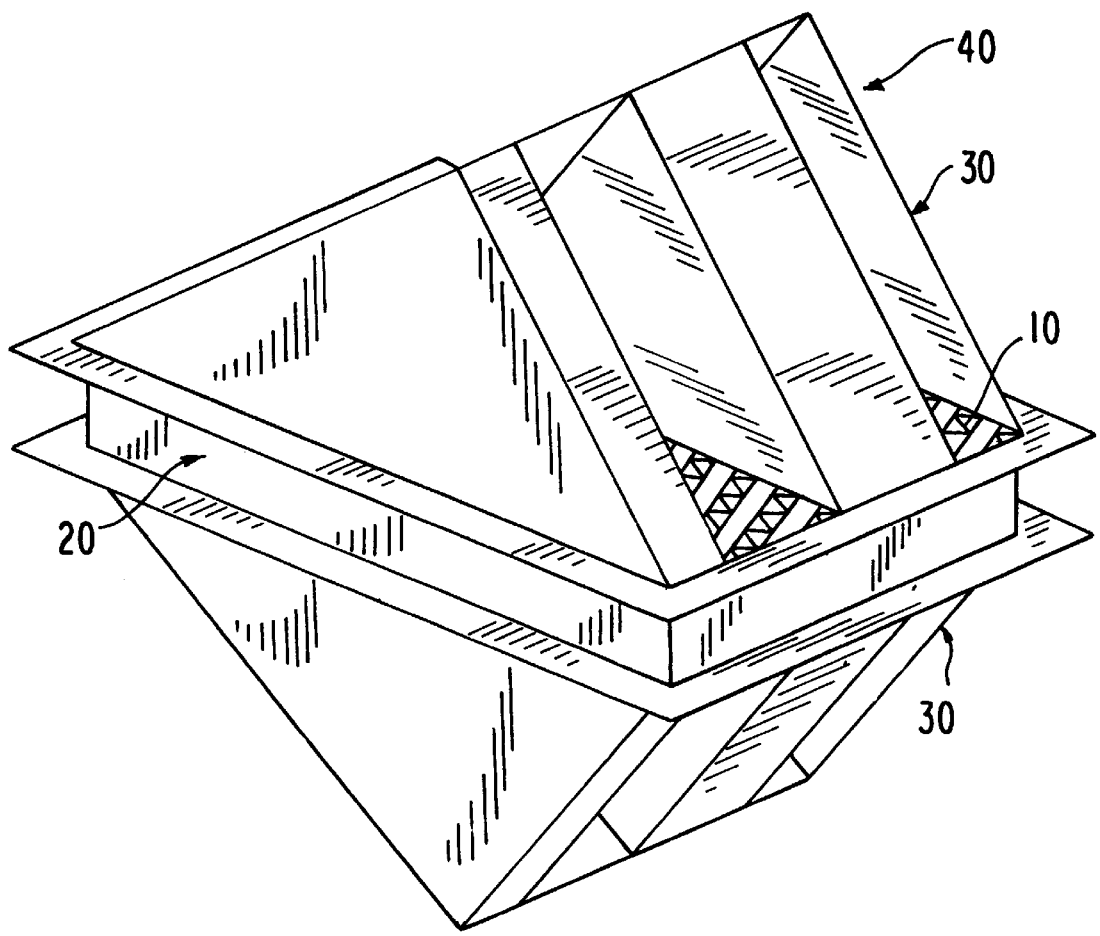
FIG. 5 illustrates the assembled unit 40 with heat exchange elements 10 in heat exchanger assembly frame 20 and manifolds 30

FIG. 5 illustrates the assembled unit 40 with heat exchange elements 10 in heat exchanger assembly frame 20 and manifolds 30

FIGS. 6A, 6B, 6C, 6D, 6E, 6F 6G, 6H, 6I, 6J, 6K, 6L illustrate the air path alternatives available through the apparatus by employing different manifold blocking patterns.

FIGS. 6A, 6B and 6C show a crossflow air path with the heat exchange elements 10 positioned in horizontal planes and heat exchange plates 12 positioned in vertical planes.

FIGS. 6D, 6E and 6F show a parallel air path with the heat exchange elements 10 positioned in horizontal planes and heat exchange plates 12 positioned in vertical planes.

Figure 6I:
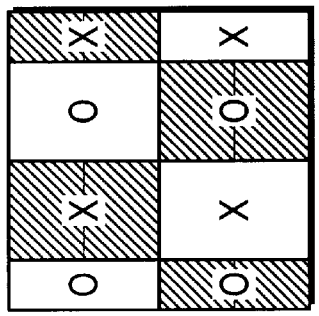
FIG. 6I is a view of FIG. 6G taken along section line 6I—6I.
Figure 6L:
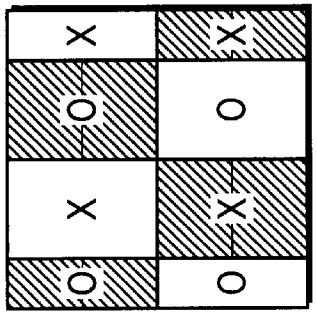
FIG. 6L is a view of FIG. 6J taken along section line 6L—6L.
Figure 6G:
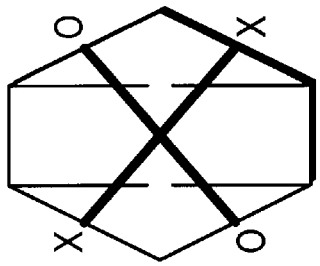
Figure 6J:
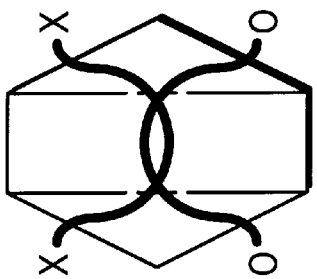
Figure 6H:
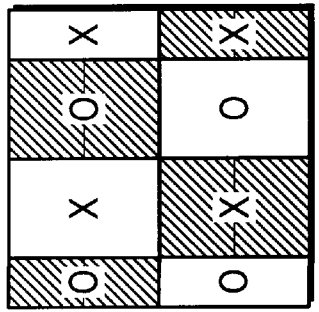
FIG. 6H is a view of FIG. 6G taken along section line 6H—6H.

FIGS. 6G, 6H and 6I show a crossflow air path with the heat exchange elements 10 positioned in vertical planes and heat exchange plates 12 positioned in horizontal planes.

Figure 6K:
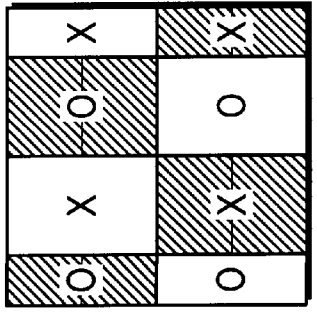
FIG. 6K is a view of FIG. 6J taken along section line 6K—6K.

FIGS. 6J, 6K and 6L show a parallel air path with the heat exchange elements 10 positioned in vertical planes and heat exchange plates 12 positioned in horizontal planes.

What is claimed is:

1. A system for conditioning air streams, comprising:

at least one fan for forcing air through said system, a first heat exchanger having an intake port, an exhaust port, and a plurality of heat conducting walls defining channels for passage of a first air stream from a first air stream intake port to a first air stream exit port and for passage of a second air stream from a second air stream intake port to a second air stream exit port;

at least one other heat exchanger having an intake port, an exhaust port, and a plurality of heat conducting walls defining channels for passage of a first air stream from a first air stream intake port to a first air stream exit port and for passage of a second air stream from a second air stream intake port to a second air stream exit port;

said first heat exchanger and said at least one other heat exchanger being secured to a frame;

two manifold assemblies, each manifold assembly including triangular dividers and triangular ends, each manifold assembly further including at least one manifold exhaust port and/or at least one manifold intake port, said at least one manifold exhaust port and/or said at least one manifold intake port being disposed in the first air stream or in the second air stream or in both the first and second air streams and said triangular dividers and triangular ends are substantially perpendicular to said heat conducting walls of said heat exchangers.

2. A system for conditioning air streams as claimed in claim 1, wherein said first air stream and said second air stream form a crossflow air path.

3. A system for conditioning air streams as claimed in claim 1, wherein said first air stream and said second air stream form a parallel air path.

4. A system for conditioning air streams as claimed in claim 1, wherein said heat conducting walls are positioned in vertical planes.

5. A system for conditioning air streams as claimed in claim 1, wherein said heat conducting walls are positioned in horizontal planes.

* * * * *